March 17, 1953 A. A. KOTTMANN 2,631,716
ENDLESS FLIGHT CONVEYER
Original Filed March 11, 1949
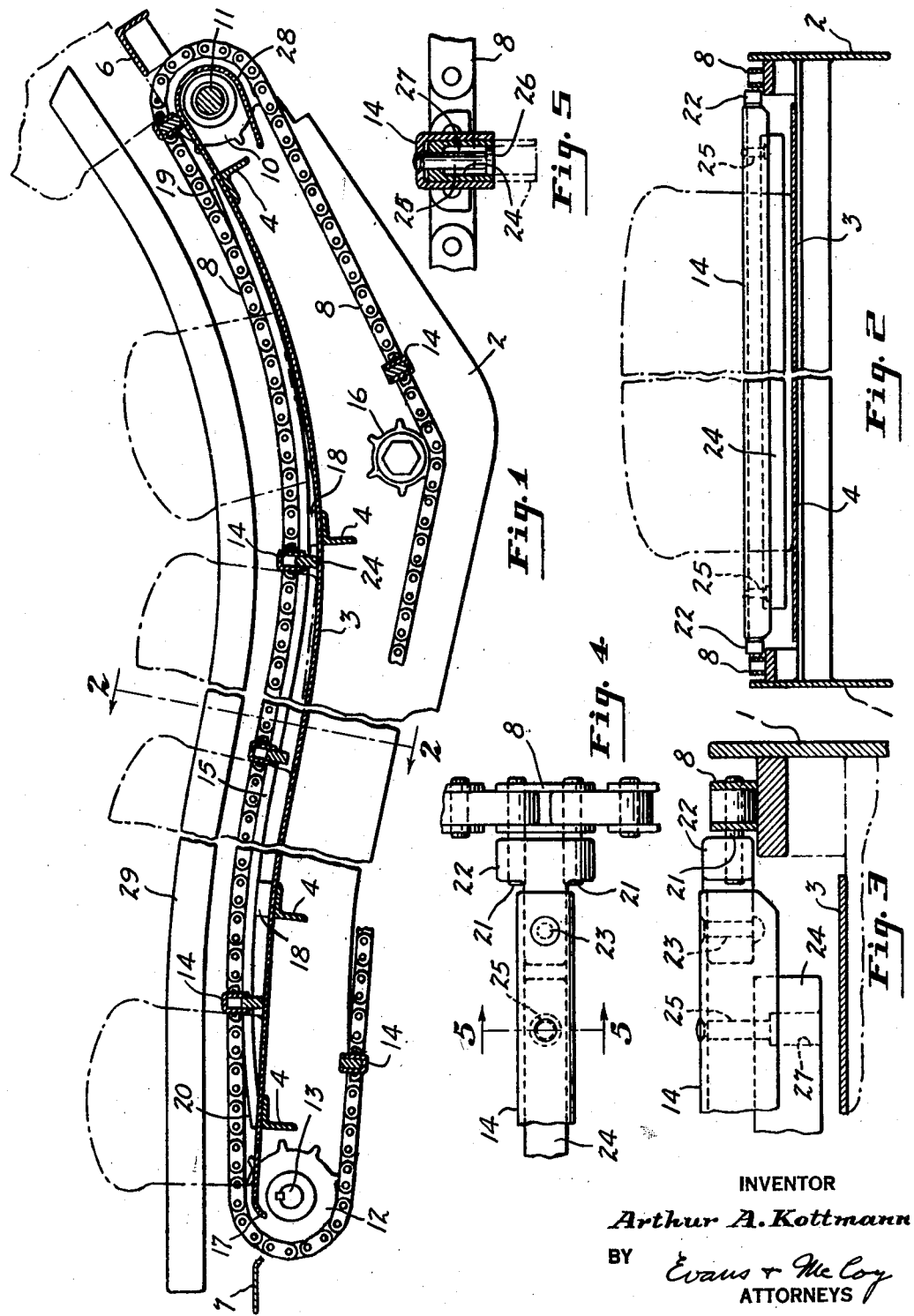
INVENTOR
Arthur A. Kottmann
BY Evans + McCoy
ATTORNEYS Patented Mar. 17, 1953

2,631,716

UNITED STATES PATENT OFFICE 2,631,716

ENDLESS FLIGHT CONVEYER

Arthur A. Kottmann, Davenport, Iowa, assignor to The Bettendorf Company, Bettendorf, Iowa, a corporation of Maryland Original application March 11, 1949, Serial No. 80,878. Divided and this application May 27, 1950, Serial No. 164,681

1 Claim. (Cl. 198—168)

This invention relates to an endless flight transfer conveyor particularly designed for transferring sliced loaves of bread from the runway of a slicing machine to the infeed mechanism of a wrapping machine, and is a division of my copending application Serial No. 80,878, filed March 11, 1949.

The conveyor flights are so constructed that they can pass through narrow slots at the receiving and discharge ends of the conveyor without damage to soft articles being delivered to or discharged from the conveyor, and have vertical movement with respect to the article supporting bed or apron during passage of the article over the supporting apron to effectively engage the articles to aline the same and push them along the supporting apron.

The invention has for its object to provide a flight conveyor suitable for handling soft articles such as sliced loaves of bread without damaging the articles either as they are delivered to the conveyor or as they are discharged therefrom and which, intermediate the ends of the conveyor, engages the article at a sufficient height above the supporting apron to maintain proper alinement of the articles while pushing them from the receiving end of the conveyor to the discharge end thereof.

Reference should be had to the accompanying drawings forming a part of this specification in which:

Figure 1 is a foreshortened longitudinal vertical section through a conveyor embodying the invention;

Fig. 2 is a foreshortened transverse vertical section through the conveyor taken on the line indicated at 2—2 in Fig. 1;

Fig. 3 is a fragmentary transverse vertical section on the same line as Fig. 2, showing a side portion of the conveyor on an enlarged scale;

Fig. 4 is a fragmentary plan view showing the connection between a flight and one of the side chains; and Fig. 5 is a section taken transversely through one of the flights on the line indicated at 5—5 in Fig. 4.

The conveyor of the present invention has side frame members 1 and 2 which may be in the form of vertical plates and between the side frame members 1 and 2 an article supporting apron 3 is provided which extends substantially the full length of the frame and which is supported on spaced crossbars 4. The discharge portion of the apron 3 is substantially horizontal and the receiving portion is inclined upwardly at substantially the same inclination as the runway which delivers sliced loaves to the transfer conveyor, the end portion of which is indicated by the numeral 6 in Fig. 1. The discharge end of the apron 3 is separated by a narrow slot from a transfer platform 7 to which the articles are discharged from the apron 3. The runway 6 may be the discharge runway of a bread slicer and the transfer platform 7 may deliver to the infeed mechanism of a wrapping machine.

Endless chains 8 are mounted one on each side of the frame members 1 and 2 and these chains pass over a pair of sprockets 10 carried by a cross shaft 11 beneath the receiving end of the apron 3. At the discharge end of the conveyor the chains 8 run over sprockets 12 mounted on stub shafts 13 carried by the frame members 1 and 2. The chains 8 are connected by cross flights 14 which serve to push the articles along the apron 3. The upper runs of the chains 8 are supported above the apron 3 by means of tracks 15 which may be in the form of flat bars suitably secured to the inner faces of the side frame members 1 and 2 and provided with smooth top faces upon which the chains 8 slide. The lower runs of the chains 8 are engaged by one or more suitable idler guide sprockets 16.

The flights 14 individually engage the front or leading sides of articles received on the inclined receiving end of the apron 3 and serve to restrain and control the downward sliding movement of such articles on the supporting apron. Beyond the bottom of the downwardly inclined receiving portion of the apron the flights 14 engage the rear or trailing sides of the articles to positively move them one at a time toward the discharge end of the apron. In moving around the sprockets 10 at the receiving end of the conveyor the flights 14 pass through a relatively narrow space between the apron 3 and the runway 6.

It is desirable that the flights be of relatively low height as they move into their upper run so that they can pass readily through the space mentioned and so that an article resting on the runway 6 will not be excessively displaced or shifted by the flight as the latter moves into position above the conveyor apron. It is also desirable that the flights be of relatively low height at the discharge end of the conveyor where the flights move around the sprockets 12 and drop below the article path through the slot between the conveyor apron 3 and the transfer platform 7. The discharge end of the apron 3 is preferably provided with a downwardly curved edge 17 over which the flights may ride as they pass downwardly through the slot between the apron and transfer platform.

The flight 14 is a relatively low flight which can pass through the slot between the apron and transfer platform after having pushed the loaf or other article onto the platform without pinching the lower edge corner of the article.

Between the infeed and discharge end of the transfer conveyor and over the major portion of the conveyor length it is preferable that flights be of relatively greater height than at the end of the conveyor so as to engage a substantial portion such as about one-third of the height of the rear side of each article being passed over the conveyor.

In the conveyor of the present invention portions of the track supporting the flights during their upper run are at varying height with respect to the apron 3. These tracks are preferably in the form of flat metal bars disposed against the inside faces of the side members 1 and 2 and supported on the crossbars 4 by spacing blocks 18 of varying thickness.

Adjacent opposite ends of the apron 3 the ends 19 and 20 of the tracks 15 are curved toward the apron 3 so that the chain supporting faces of the tracks at the ends 19 and 20 thereof approach relatively close to the surface of the apron 3. Throughout the major portion of the length of the apron, however, the side chains 8 are elevated by the tracks 15 above the level of the apron 3 as shown in Figs. 1 and 3. In moving through their upper run the flights 15 are closely adjacent the apron 3 as they pass over the receiving end of the apron and are gradually and progressively raised to their position of maximum elevation above the apron 3. The flights then move over the major portion of their article advancing path in their elevated positions and then as they approach the discharge end of the apron the flights are gradually lowered as the chains move over the downwardly inclined end portions 20 of the tracks 15. The described high-low cycle of each flight as it is moved over its article advancing path provides a positive vertical sliding movement of the flight relative to the article advanced by it. Such relative movement serves to arrange or justify misplaced slices in the loaf and more securely holds the loaf against displacement during its travel over the apron by engaging relatively elevated portions thereof. It will be apparent that the tracks 15 can be raised or lowered to increase or decrease the vertical movement of the flights with respect to the apron.

The flights 14 are mounted to float transversely between the chain belts 8 so that in moving around the various supporting and guiding sprockets the chains are free to shift toward or away from one another without imposing objectionable strains on the mechanism. At the spaced positions along the chains at which the flights are to be attached, elongated pins 21 are substituted for the conventional pivot pins of the chain. These pins extend inwardly from the chains and are spaced apart. The pins 21 slidingly fit in sockets formed in fittings 22 that are attached to the ends of the flights 14. The flights 14 are preferably in the form of channel bars and are attached to the fittings 22 in such manner that their channels face downwardly when in their lower run beneath the apron 3.

The fittings 22 have an inwardly extending portion received in the channel flight bar 14 and secured to the bar by means of rivets 23. The flights 14 may be made extensible by means of inserts 24 nested or telescoped in the flight channel. The inserts 24 are preferably in the form of elongated bars which may be formed of metal or plastic material and which are of a size to be received within the channel of the flights 14 and to slide freely within the channel. These flight extension members are retained in the flight bars by suitable means such as shouldered guide pins 25 which are rigidly attached to the webs of the channels 14 and pass through apertures in the bars 24. The guide pins 25 have heads 26 that are received in counterbores 27 in the bars 25 and that serve to limit the telescoping movements of the bars 24 with respect to the channels 14.

As the flights move along their article advancing path over the apron 3 the bars 14 are individually elevated above the apron 3 and the extension bars 24 drop by gravity from the flight channels until the bottoms of the counterbores 26 engage the heads 25. During travel of the flights over the major portion of the apron the bars 24 are suspended in their lowermost positions on the guide pins 25. As the chains 8 move over the downwardly curved end portions 20 of the supporting tracks 15, the lower edges of the extension bars 24 engage the apron 3 and the extensions 24 are telescoped into the channels of the flight bars. As the flights move through the slot between the apron 3 and the transfer platform 7 the flight bars are inverted and the bars 24 are retained by gravity within the channels of the flights 14 during the lower or return run of the flight.

At the receiving end of the conveyor the apron 3 is curved around the shaft 11 and extends forwardly beneath the same to engage the flights 14 as they approach the receiving end of the apron and hold the extension bars 24 in retracted position while the flights move through the slot between the runway 6 and the apron 3.

Suitable guide rails 29 may be provided for engagement with opposite ends of a sliding loaf or other article conveyed over the apron 3.

It is to be understood that in accordance with the provisions of the patent statutes, variations and modifications of the specific devices herein shown and described may be made without departing from the spirit of the invention.

What I claim is:

In an article handling apparatus a conveyor comprising an article supporting apron, a pair of endless side chains having upper article advancing runs and lower flight returning runs, rotatable members supporting the side chains, flights extending between the chains at spaced intervals and movable over the apron, said flights being in the form of channel bars attached to chains with their channels opening downwardly while passing over said plate and upwardly while passing beneath the plate, inserts slidably mounted in said bars and movable by gravity to positions in which they project below the lower edges of the flights, and tracks along the margins of the apron for supporting the article advancing runs of the chains, the tracks having portions at different relative elevations with respect to the apron so that the chains and the flights carried thereby move relatively toward and away from the apron during movement of the flights over the apron in advancing articles.

ARTHUR A. KOTTMANN.

REFERENCES CITED

The following references are of record in the file of this patent:

UNITED STATES PATENTS

| Number | Name | Date |
| --- | --- | --- |
| 1,162,382 | Moore | Nov. 30, 1915 |
| 1,930,292 | Van Hooydonk | Oct. 10, 1933 |
| 2,263,458 | Gellatly | Nov. 18, 1941 |
| 2,546,262 | Hatcher | Mar. 27, 1951 |